United States Patent
Chen et al.

(10) Patent No.: US 12,344,304 B2
(45) Date of Patent: Jul. 1, 2025

(54) STEERING WHEEL AND HEAT-CONDUCTING DEVICE

(71) Applicant: PIXART IMAGING INC., Hsin-Chu (TW)

(72) Inventors: Ching-Shun Chen, Hsin-Chu (TW); Yi-Hsien Ko, Hsin-Chu (TW)

(73) Assignee: PIXART IMAGING INC., Hsin-Chu (TW)

( * ) Notice: Subject to any disclaimer, the term of this patent is extended or adjusted under 35 U.S.C. 154(b) by 501 days.

(21) Appl. No.: 17/882,722

(22) Filed: Aug. 8, 2022

(65) Prior Publication Data

US 2023/0067992 A1 Mar. 2, 2023

Related U.S. Application Data

(60) Provisional application No. 63/236,267, filed on Aug. 24, 2021.

(30) Foreign Application Priority Data

Jun. 16, 2022 (CN) .......................... 202210687647.0

(51) Int. Cl.
*B62D 1/06* (2006.01)
*G01D 5/24* (2006.01)
(Continued)

(52) U.S. Cl.
CPC ............. *B62D 1/06* (2013.01); *G01D 5/2405* (2013.01); *H05B 1/0236* (2013.01); *H05B 3/342* (2013.01); *H05B 2214/04* (2013.01)

(58) Field of Classification Search
CPC .......... B62D 1/046; B62D 1/06; B62D 1/065; G01D 5/2405; H05B 1/0236;
(Continued)

(56) References Cited

U.S. PATENT DOCUMENTS

| 9,815,488 B2 * | 11/2017 | Lofy ...................... B62D 1/065 |
| 10,232,858 B2 * | 3/2019 | Odate .................. H05B 1/0236 |
| 2020/0196392 A1 | 6/2020 | Seki et al. |

FOREIGN PATENT DOCUMENTS

| CN | 209719707 U | 12/2019 |
| EP | 1451055 B1 | 8/2007 |

(Continued)

*Primary Examiner* — Ibrahime A Abraham
*Assistant Examiner* — Joe E Mills, Jr.
(74) *Attorney, Agent, or Firm* — Li & Cai Intellectual Property (USA) Office (57) ABSTRACT

A steering wheel and a heat-conducting device are provided. The steering wheel includes a body, a handle, a heating device, an electronic control unit, a heat-conducting member and a base. The handle is adjacent to the body, and the heating device is disposed in the handle and receives a driving signal to generate heat accordingly. The electronic control unit is electrically connected to the heating device through a driving wire, and provides the driving signal to the heating device. The heat-conducting member forms a waste heat path, and the heat-conducting member and the heating device are located at different locations in the handle. The base is connected to the electronic control unit, collects waste heat from the electronic control unit, and is connected to the heat-conducting member through a heat dissipation wire to transfer the waste heat to the heat-conducting member.

9 Claims, 6 Drawing Sheets

(51) Int. Cl.
*H05B 1/02* (2006.01)
*H05B 3/34* (2006.01)

(58) Field of Classification Search
CPC .......... H05B 2203/037; H05B 2214/04; H05B 3/34; H05B 3/342; H05K 7/20–2099
See application file for complete search history.

(56) References Cited

FOREIGN PATENT DOCUMENTS

EP          2346730 B1     4/2014
EP          3619092 B1     6/2021

* cited by examiner

STEERING WHEEL AND HEAT-CONDUCTING DEVICE

CROSS-REFERENCE TO RELATED PATENT APPLICATION

This application claims the benefit of priority to China Patent Application No. 202210687647.0, filed on Jun. 16, 2022 in People's Republic of China. The entire content of the above identified application is incorporated herein by reference.

This application claims the benefit of priority to the U.S. Provisional Patent Application Ser. No. 63/236,267 filed on Aug. 24, 2021, which application is incorporated herein by reference in its entirety.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a steering wheel and a heat-conducting device, and more particularly to a steering wheel which can recycle waste heat of an electronic control unit.

BACKGROUND OF THE DISCLOSURE

Steering wheels with heating function are currently available on the market. For example, a heating device made of conductive material with high resistance can be disposed in a handle of the steering wheel, and the heating device generates heat according to a current provided by the electronic control unit. However, the electronic control unit also heats up in response to a supplied current and may cause damage to the electronic control unit due to an excessively high operating temperature.

SUMMARY OF THE DISCLOSURE

In response to the above-referenced technical inadequacies, the present disclosure provides a steering wheel that can recycle waste heat of an electronic control unit.

In one aspect, the present disclosure provides a steering wheel, which includes a body, a handle, a heating device, an electronic control unit, a heat-conducting member and a base. The handle is adjacent to the body, and the heating device is disposed in the handle and configured to receive a driving signal and generate heat according to the driving signal. The electronic control unit is electrically connected to the heating device through a driving wire, and provides the driving signal to the heating device. The heat-conducting member is disposed in the handle to form a waste heat path, and the heat-conducting member and the heating device are located at different locations in the handle. The base is connected to the electronic control unit, collects waste heat from the electronic control unit, and is connected to the heat-conducting member through a heat dissipation wire to transfer the waste heat to the heat-conducting member.

Preferably, the steering wheel further includes a hands-off detection circuit disposed in the handle, and the hands-off detection circuit is configured to detect whether a hand of a driver is placed on the handle.

Preferably, the hands-off detection circuit includes a sensing layer, a ground layer and an isolation layer. A coupling capacitance between the sensing layer and the ground layer changes in response to the hand of the driver being placed on the handle, and the isolation layer is disposed between the sensing layer and the ground layer.

Preferably, the hands-off detection circuit further includes a processor. The processor is coupled to the sensing layer and the ground layer, and is configured to detect whether the coupling capacitance changes, so as to determine whether the hand of the driver is placed on the handle. In response to detecting that the coupling capacitance changes, the processor is configured to determine that the hand of the driver is placed on the handle.

Preferably, the handle has a normal direction oriented from an inner core of the handle toward an outside of the handle, and the hands-off detection circuit is disposed at a location higher than a location of the heating device along the normal direction.

Preferably, the ground layer or the isolation layer of the hands-off detection circuit serves as the heat-conducting member to form the waste heat path in the handle.

Preferably, the isolation layer is made of graphene, and both the sensing layer and the ground layer are conductive fabrics.

Preferably, the heating device includes a plurality of heating electrodes, each of the heating electrodes generates heat according to a conduction state thereof, and a quantity of the heating electrodes increases as distances between the heating electrodes and a junction where the heat dissipation wire is connected to the heat-conducting member increase.

Preferably, the steering wheel further includes a temperature sensing device that is configured to detect a plurality of temperatures at a plurality of locations in the handle, and a quantity of the heating electrodes that are triggered by the heating device increases at the locations where the detected temperatures decrease.

In another aspect, the present disclosure provides a heat-conducting device, which is used for a steering wheel of a vehicle steering system. The heat-conducting device is connected to an electronic control unit of the steering wheel, and is configured to transfer heat generated by the electronic control unit to a metal structure of the vehicle steering system for heat dissipation, and the heat-conducting device is made of graphene.

Preferably, the heat-conducting device has at least one fastening point corresponding to at least one fastener, such that the heat-conducting device is fixed between the electronic control unit and the metal structure through the at least one fastening point and the at least one fastener.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 1:
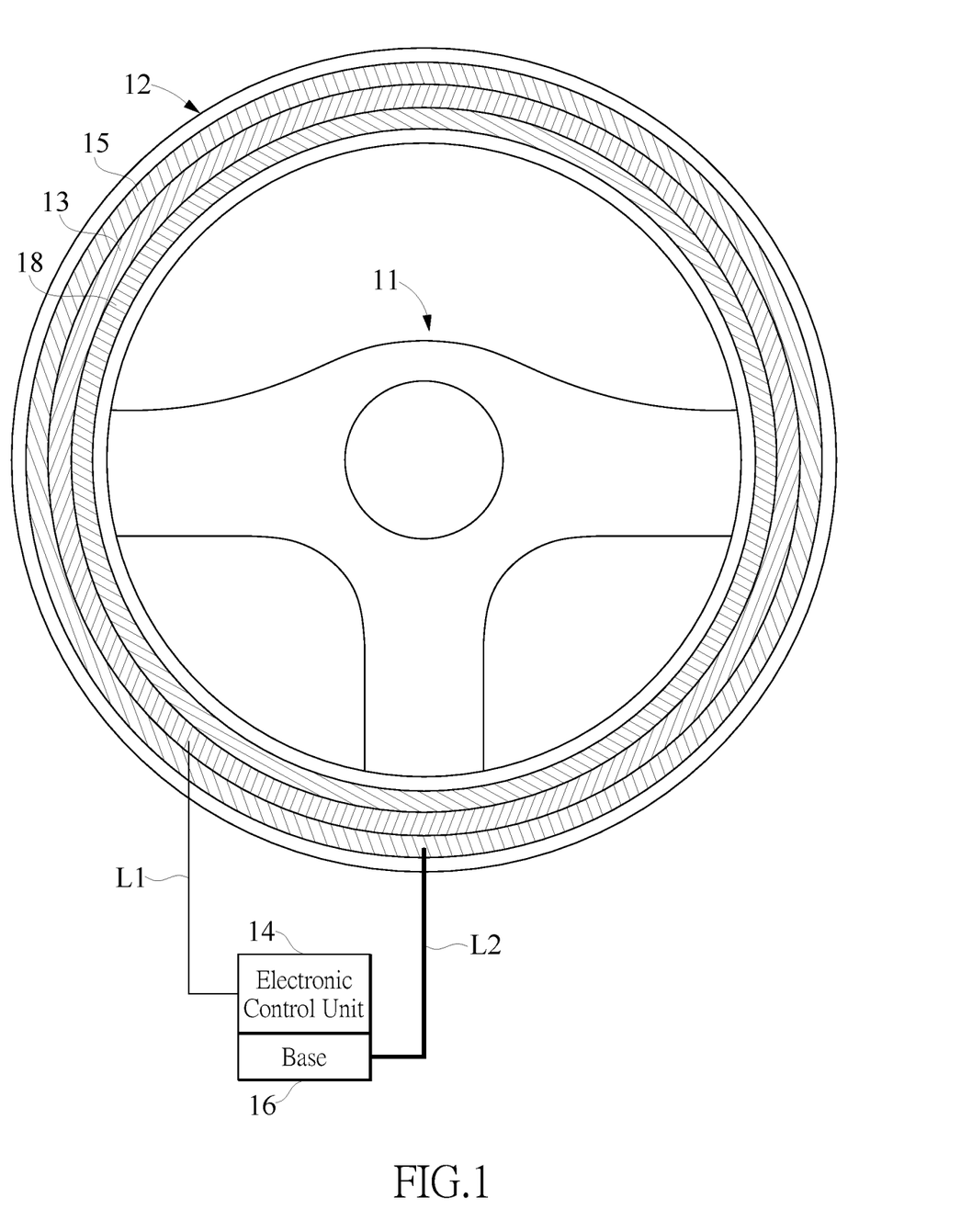
FIG. 1 is a schematic plan view of a steering wheel according to one embodiment of the present disclosure.

Reference is made to FIG. 1, which is a schematic plan view of a steering wheel according to one embodiment of the present disclosure. As shown in FIG. 1, the steering wheel 1 includes a body 11, a handle 12, a heating device 13, an electronic control unit 14, a heat-conducting member 15 and a base 16. The handle 12 is adjacent to the body 11. The present disclosure does not limit a specific implementation, in which the grip 12 is adjacent to the body 11, and for the convenience of the following description, the handle 12 is an annular handle as an example, but the present disclosure is not limited thereto. The heating device 13 is disposed in the handle 12, and is configured to receive a driving signal and generate heat according to the driving signal.

The electronic control unit 14 is electrically connected to the heating device 13 through a driving wire L1, and provides the driving signal to the heating device 13. For example, the heating device 13 can be made of a conductive material with high resistance, and therefore in certain embodiments, the driving signal provided by the electronic control unit 14 can be a current, and the heating device 13 generates heat according to the current, but the present disclosure is not limited thereto. In addition, the electronic control unit 14 can be disposed outside the body 11 or disposed in the body 11, but the present disclosure is not limited thereto.

The heat-conducting member 15 is disposed in the handle 12 to form a waste heat path, and the heat-conducting member 15 and the heating device 13 are located at different locations in the handle 12. It should be noted that, a structure of the heating device 13 and the heat-conducting member 15 depicted in FIG. 1 are merely used to indicate that the heating device 13 and the heat-conducting member 15 are located at different locations in the handle 12. In the present embodiment, the heat conducting member 15 can be adjacent to a surface layer of the handle 12 and cover the heating device 13, but the present disclosure is not limited thereto. In other words, a relative positional relationship between the heating device 13 and the heat-conducting member 15 is not constant, and the heating device 13 can also be adjacent to the surface layer of the handle 12 and cover the heat-conducting member 15.

The base 16 is connected to the electronic control unit 14 for collecting waste heat from the electronic control unit 14, and is connected to the heat-conducting member 15 through a heat dissipation wire L2 to transfer the waste heat to the heat-conducting member 15. Most of the waste heat of the electronic control unit 14 is generated by metal-oxide-semiconductor field-effect transistors (MOSFETs) inside the electronic control unit 14, and therefore in certain embodiments, the base 16 can be connected to the MOSFETs, but the present disclosure does not limit a specific implementation of the base 16.

Unlike the electronic control unit 14, which transmits the driving signal to the heating device 13 through the driving line L1, the base 16 directly transmits the waste heat from the electronic control unit 14 to the heat conducting member 15 through the heat dissipation wire L2, such that the steering wheel 1 can recycle the waste heat from the electronic control unit 14 to avoid the electronic control unit 14 from being damaged by an excessive operating temperature. In addition, the heat dissipation wire L2 can be made of the same material as the base 16 or a different material, such as metal or graphene. Both the heat dissipation wire L2 and the heat conducting member 15 can be provided with excellent thermal conductivities, so as to transfer the waste heat of the electronic control unit 14 faster, but the present disclosure does not limit the specific implementations of the heat dissipation wire L2 and the heat conducting member 15.

Figure 2A:
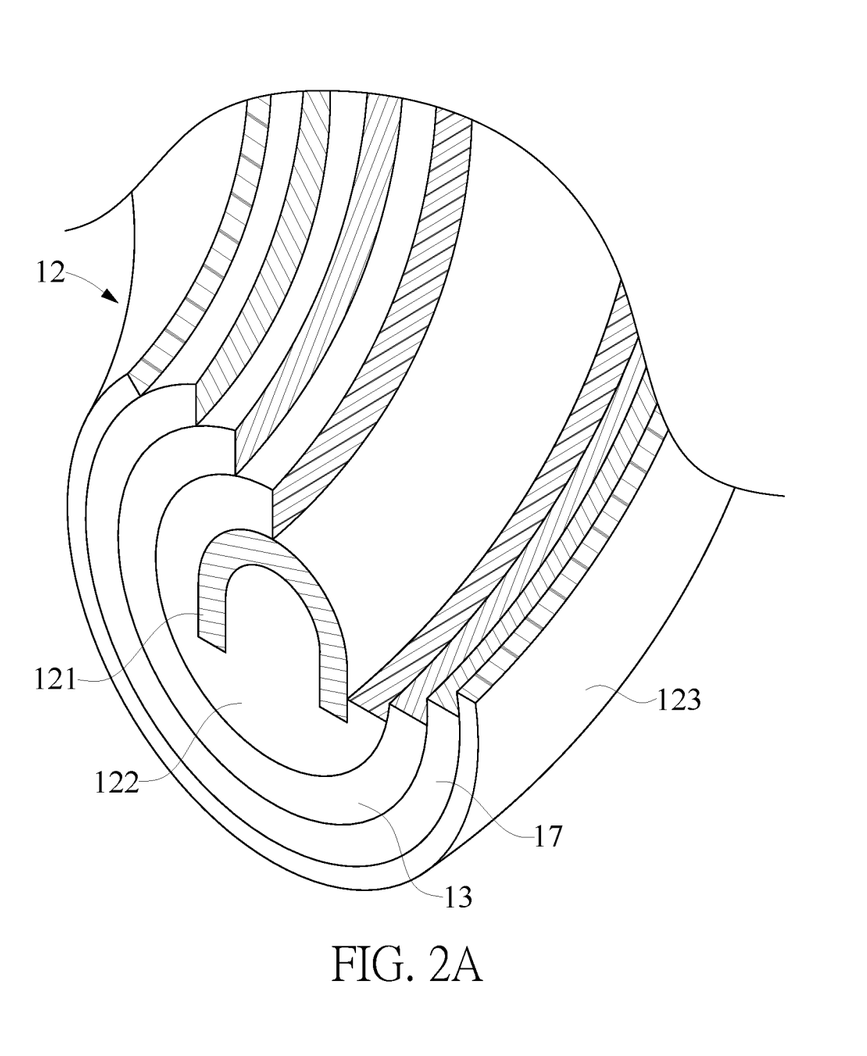
FIGS. 2A and 2B are partial cross-sectional schematic views of a handle of a steering wheel according to one embodiment of the present disclosure.
Figure 2B:
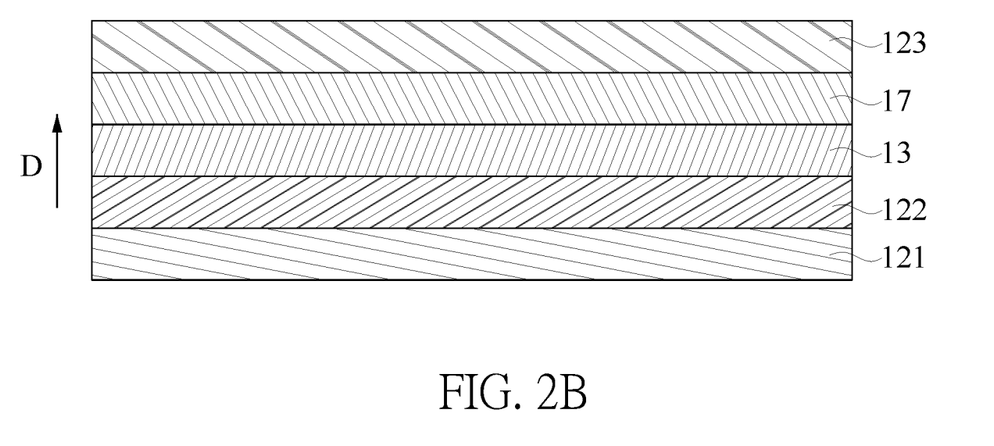

Reference is made to FIGS. 2A and 2B, FIGS. 2A and 2B are partial cross-sectional schematic views of a handle of a steering wheel according to one embodiment of the present disclosure. As shown in FIGS. 2A and 2B, the heating device 13 can be covered on a foam material 122 of the handle 12, and the foam material 122 is covered on a frame 121 of the handle 12, but the present disclosure does not limit specific implementations of the frame 121 and the foamed material 122. In addition, for an advanced driving assistance system, the steering wheel 1 can further include a hands-off detection circuit 17. The hands-off detection circuit 17 is disposed in the handle 12, and is configured to detect whether a driver places his/her hand on the handle 12.

Figure 3:
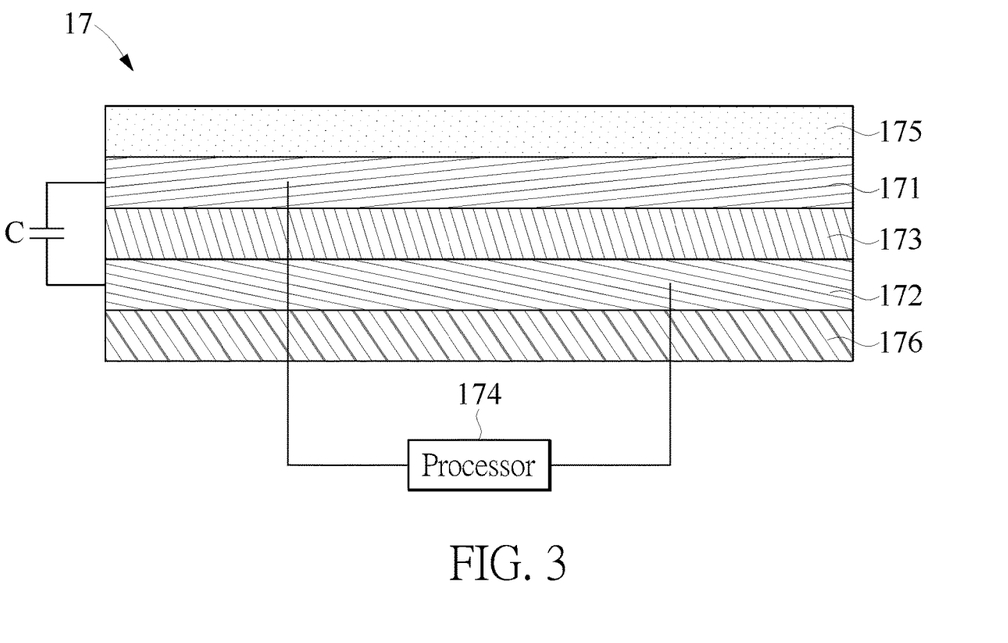
FIG. 3 is a schematic diagram of a hands-off detection circuit of FIGS. 2A and 2B.

Reference can be made to FIG. 3 together, FIG. 3 is a schematic diagram of a hands-off detection circuit of FIGS. 2A and 2B. As shown in FIG. 3, the hands-off detection circuit 17 includes a sensing layer 171, a ground layer 172 and an isolation layer 173. A coupling capacitance C between the sensing layer 171 and the ground layer 172 changes in response to the hand of the driver being placed on the handle, and the isolation layer 173 is disposed between the sensing layer 171 and the ground layer 172. That is, the hands-off detection circuit 17 is a capacitive sensing circuit, and can further include a processor 174. The processor 174 is coupled to the sensing layer 171 and the ground layer 172, and is configured to detect whether the coupling capacitance C changes, so as to determine whether the hand of the driver is placed on the handle 12.

Specifically, in response to detecting that the coupling capacitance C changes, the processor 174 is configured to determine that the hand of the driver is placed on the handle 12. In some embodiments, the electronic control unit 14 of FIG. 1 can directly serve as the processor 174 of the hands-off detection circuit 17, but the present disclosure is not limited thereto. In addition, in order to enable the coupling capacitance C to be changed accurately in response to the hand of the driver being placed on the handle 12, the hands-off detection circuit 17 can cover the heating device 13 so as to be adjacent to a surface layer 123 of the handle 12. That is, the handle 12 can have a normal direction D oriented from an inner core of the handle 12 toward an outside of the handle 12, and the hands-off detection circuit 17 is disposed at a location higher than a location of the heating device 13 along the normal direction D.

In this embodiment, the surface layer 123 of the handle 12 is made of leather, and the hands-off detection circuit 17 can further include an adhesive layer 175 covering the sensing layer 171 and a protective layer 176 located under the ground layer 172, and the present disclosure is not limited thereto. It should be noted that, in order to optimize a space utilization of the steering wheel 1 under a premise that the hands-off detection circuit 17 is included for the advanced driving assistance system, the ground layer 172 or the isolation layer 173 of the hands-off detection circuit 17 can serve as the heat-conducting member 15 to form the waste heat path in the handle 12, thereby effectively reducing a cost of the heat-conducting member 15. In addition, the isolation layer 173 of the hands-off detection circuit 17 can be made of graphene, and both the sensing layer 171 and the ground layer 172 can be conductive fabrics, but the present disclosure is not limited thereto.

On the other hand, since the waste heat transmitted by the heat-conducting member 15 attenuates with distance, and therefore, when the waste heat of the electronic control unit 14 is transmitted to the heat-conducting member 15 through the heat dissipation wire L2, a temperature difference (that is, a rise amount of the temperature) decreases as a distance from a junction where the heat dissipation wire L2 is connected increases. That is, when only the waste heat is considered, a region of the heat-conducting member 15 that is farther from the junction has a lower temperature. For example, in the present embodiment, a location directly above the steering wheel 1 in FIG. 1 is taken as 12 o'clock direction, if the heat dissipation wire L2 is connected to the heat conducting member 15 at 6 o'clock direction, when the waste heat of the electronic control unit 14 is transmitted to the heat-conducting member 15 through the heat dissipation wire L2, a region of the heat-conducting member 15 on the 12 o'clock direction should have the lowest temperature, and a region on the 6 o'clock direction should have the highest temperature.

Figure 4:
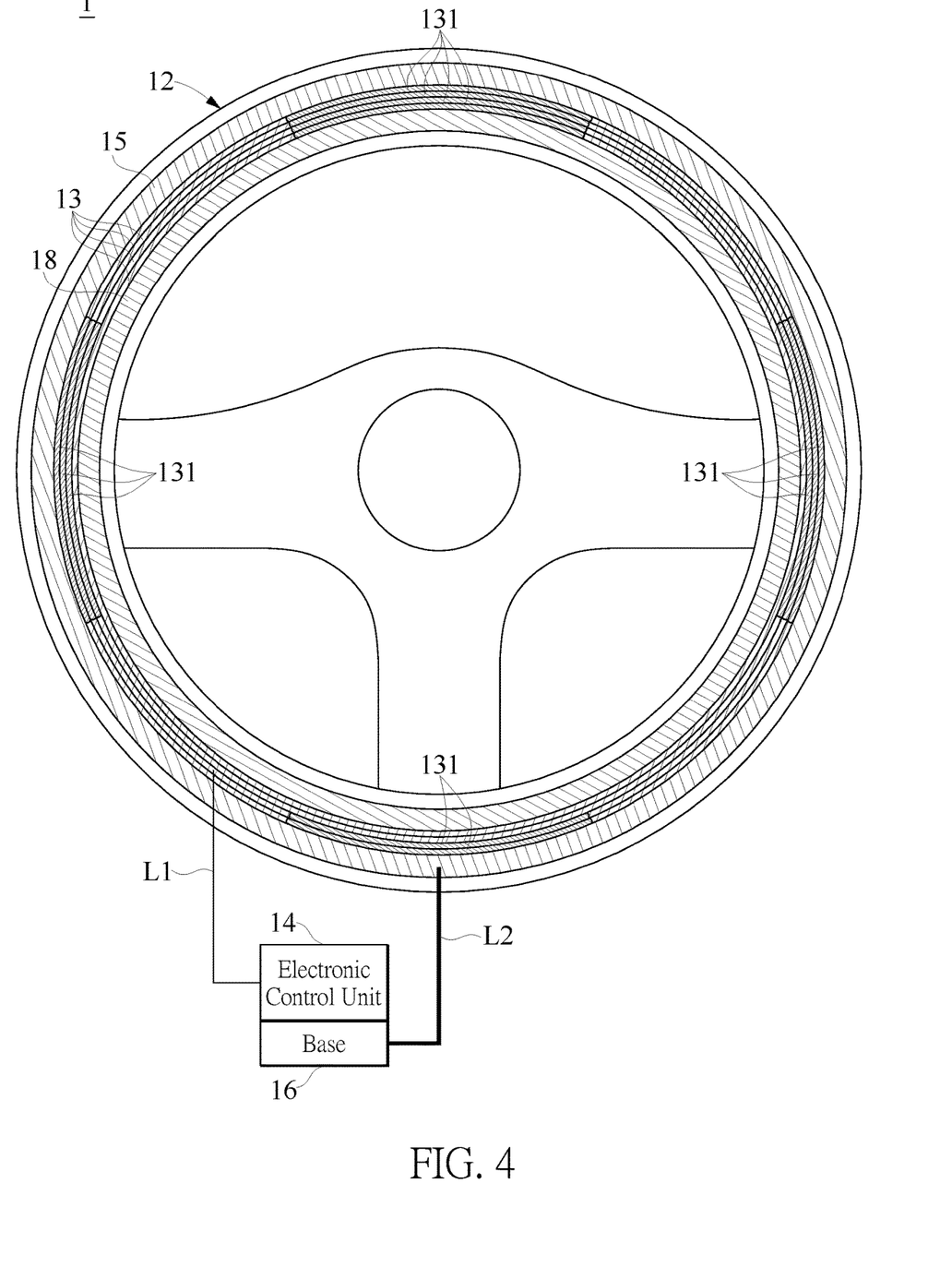
FIG. 4 is a schematic diagram of a heating device including a plurality of heating electrodes according to one embodiment of the present disclosure.

Reference is made to FIG. 4, which is a schematic diagram of a heating device including a plurality of heating electrodes according to one embodiment of the present disclosure. As shown in FIG. 4, in order to compensate for a temperature difference between different regions of the heat-conducting member 15, the heating device 13 can include a plurality of heating electrodes 131. Each of the heating electrodes 131 generates heat according to a conduction state thereof, and a quantity of the heating electrodes 131 increases as distances between the heating electrodes 131 and a junction where the heat dissipation wire L2 is connected to the heat-conducting member 15 increase, such that the heating device 13 can be configured to generate more heat at a location that is farther away from the junction, which also helps to make each location of the handle 12 have the same temperature after being heated by the heating device 13 and the waste heat of the electronic control unit 14, so as to achieve uniform heating.

For example, N of the heating electrodes 131 of the heating device 13 can be arranged at the 6 o'clock direction, where N is any positive integer, and 2N of the heating electrodes 131 can be arranged at the 12 o'clock direction, but the present disclosure is not thereto. In some embodiments, the plurality of heating electrodes 131 of the heating device 13 can be evenly arranged, and the heating device 13 can further include a controller and a plurality of switches electrically connected to the plurality of heating electrodes 131. The controller controls ON or OFF state of each of the plurality of switches, so as to control quantities of the plurality of heating electrodes 131 that are turned on at different locations, thereby achieving uniform heating. That is, at locations that are farther from the junction between the heat dissipation wire L2 and the heat-conducting member 15, the more quantities of the heating electrode 131 can be controlled to be turned on by the heating device 13, and this arrangement can also be used together with the temperature sensing device 18 described hereinafter.

In detail, the steering wheel 1 can further include a temperature sensing device 18 electrically connected to the heating device 13, and the temperature sensing device 18 can include one or more temperature sensors for detecting a plurality of temperatures at a plurality of locations in the handle 12. For example, the temperature sensing device 18 can detect two temperatures of the handle 12 at two locations in the 6 o'clock direction and the 12 o'clock direction, but the present disclosure is not limited thereto. In other words, the temperature sensing device 18 can be used to detect a temperature difference between different locations of the handle 12. However, in order to compensate for the temperature difference between the different locations, the heating device 13 can be configured to, according to the detected temperature difference, turn on more heating electrodes 131 at locations with lower temperatures through the above control method, or turn off corresponding switches at locations with excessive high temperatures to reduce the quantities of the heating electrodes 131 that are turned on. The above are only examples, and the present disclosure is not limited thereto.

Figure 5:
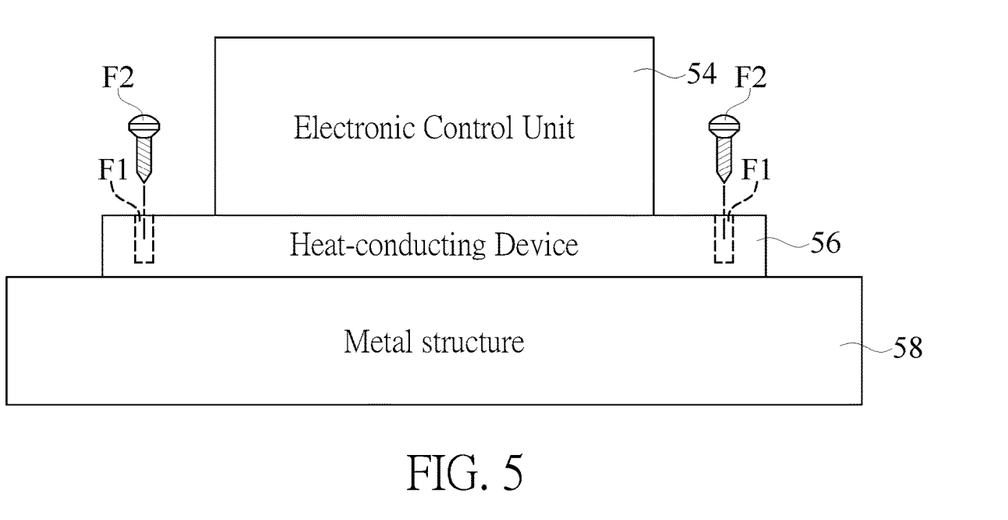
FIG. 5 is a schematic diagram of a heat-conducting device according to one embodiment of the present disclosure.

On the other hand, if a metal structure is considered to dissipate heat to avoid damage to the electronic control unit due to excessive operating temperature, the base 16 of FIG. 1 can also be directly used as a heat-conducting device. Reference is made to FIG. 5, which is a schematic diagram of a heat-conducting device according to one embodiment of the present disclosure. As shown in FIG. 5, a heat-conducting device 56 is used for a steering wheel of a vehicle steering system (for example, the steering wheel 1 in FIG. 1, but the present disclosure is not limited thereto), and the heat-conducting device 56 is connected to an electronic control unit 54 of the steering wheel, and is configured to transfer heat generated by the electronic control unit 54 to a metal structure 58 of the vehicle steering system (for example, a metal steering shaft or metal spokes of the steering wheel of the vehicle steering system) for heat dissipation.

Specifically, the heat-conducting device 56 can be equivalent to the base 16 of FIG. 1, which is made of graphene with excellent thermal conductivity, and is directly connected to the metal structure 58 of the vehicle steering system. Therefore, thermal energy generated by the electronic control unit 54 is transferred more quickly to the metal structure 58 through the heat-conducting device 56 that is made of graphene, and also helps the metal structure 58 to dissipate the heat of the electronic control unit 54. In addition, the heat-conducting device 56 can have at least one fastening point F2 corresponding to at least one fastener F1, such that the heat-conducting device 56 can be fixed between the electronic control unit 54 and the metal structure 58 through the at least one fastener F1 and the at least one fastening point F2.

In conclusion, in the steering wheel provided by the present disclosure, the waste heat of the electronic control unit can be recycled through the heat-conducting member and the base, so as to avoid the electronic control unit from being damaged by excessive working temperature, and under a premise that the hands-off detection circuit 17 is included for the advanced driving assistance system, the ground layer or the isolation layer of the off-hand detection circuit can serve as the heat-conducting member, so as to effectively reduce the cost of the heat-conducting member. Furthermore, a quantity of the heating electrodes increases as distances between the heating electrodes and a junction where the heat dissipation wire is connected to the heat-conducting member increase, such that the temperature difference between different regions of the heat conducting member can be compensated, thereby helping to make each location of the handle have the same temperature after being heated by the heating device and the waste heat of the electronic control unit, so as to achieve uniform heating. The heating device can be configured to turn on more heating electrodes at locations with lower temperatures to compensate temperature difference between different locations.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A steering wheel, comprising:
    a body;
    a handle adjacent to the body;
    a heating device disposed in the handle, wherein the heating device is configured to receive a driving signal and generate heat according to the driving signal;
    an electronic control unit electrically connected to the heating device through a driving wire, and providing the driving signal to the heating device;
    a heat-conducting member disposed in the handle to form a waste heat path, wherein the heat-conducting member and the heating device are located at different locations in the handle; and
    a base connected to the electronic control unit, wherein the base collects waste heat from the electronic control unit, and is connected to the heat-conducting member through a heat dissipation wire to transfer the waste heat to the heat-conducting member.

2. The steering wheel according to claim 1, further comprising:
    a hands-off detection circuit disposed in the handle, wherein the hands-off detection circuit is configured to detect whether a hand of a driver is placed on the handle.

3. The steering wheel according to claim 2, wherein the hands-off detection circuit includes:
    a sensing layer;
    a ground layer, wherein a coupling capacitance between the sensing layer and the ground layer changes in response to the hand of the driver being placed on the handle; and
    an isolation layer disposed between the sensing layer and the ground layer.

4. The steering wheel according to claim 3, wherein the hands-off detection circuit further includes:
    a processor coupled to the sensing layer and the ground layer, wherein the processor is configured to detect whether the coupling capacitance changes, so as to determine whether the hand of the driver is placed on the handle;
    wherein, in response to detecting that the coupling capacitance changes, the processor is configured to determine that the hand of the driver is placed on the handle.

5. The steering wheel according to claim 3, wherein the handle has a normal direction oriented from an inner core of the handle toward an outside of the handle, and the hands-off detection circuit is disposed at a location higher than a location of the heating device along the normal direction.

6. The steering wheel of claim 5, wherein the ground layer or the isolation layer of the hands-off detection circuit serves as the heat-conducting member to form the waste heat path in the handle.

7. The steering wheel according to claim 3, wherein the isolation layer is made of graphene, and both the sensing layer and the ground layer are conductive fabrics.

8. The steering wheel according to claim 1, wherein the heating device includes a plurality of heating electrodes, each of the heating electrodes generates heat according to a conduction state thereof, and a quantity of the heating electrodes increases as distances between the heating electrodes and a junction where the heat dissipation wire is connected to the heat-conducting member increase.

9. The steering wheel according to claim 8, wherein the steering wheel further includes a temperature sensing device that is configured to detect a plurality of temperatures at a plurality of locations in the handle, and a quantity of the heating electrodes that are triggered by the heating device increases at the locations where the detected temperatures decrease.

* * * * *